United States Patent [19]

Swanson et al.

[11] 3,723,174
[45] Mar. 27, 1973

[54] PIGMENT FOR PRESSURE SENSITIVE RECORD MATERIAL

[75] Inventors: David B. Swanson, Cranford; Barry S. Miller, Roselle, both of N.J.

[73] Assignee: Engelhard Minerals & Chemical Corporation, Edison, N.J.

[22] Filed: Jan. 6, 1971

[21] Appl. No.: 104,474

Related U.S. Application Data

[63] Continuation-in-part of Ser. No. 765,979, Oct. 8, 1968, abandoned.

[52] U.S. Cl. ........... 117/155 UA, 117/36.2, 117/152, 117/156
[51] Int. Cl. ............................................. D21h 1/28
[58] Field of Search........... 117/36.2, 36.8, 36.9, 152, 117/155 UA, 156; 106/72, 288

[56] References Cited

UNITED STATES PATENTS

| | | | |
|---|---|---|---|
| 3,226,252 | 12/1965 | Hemstock | 117/36.9 X |
| 3,223,546 | 12/1965 | Hemstock | 117/36.2 X |
| 3,224,892 | 12/1965 | Hemstock | 117/36.2 X |
| 3,301,691 | 1/1967 | Hemstock et al. | 106/288 X |
| 3,303,035 | 2/1967 | Hemstock et al. | 106/72 |
| 3,309,211 | 3/1967 | Weiss et al. | 106/288 X |
| 3,309,214 | 3/1967 | Podschus et al. | 106/288 |
| 3,378,718 | 5/1967 | Beamesdoffer | 117/152 X |
| 3,477,970 | 11/1969 | Beeman | 117/155 X |

Primary Examiner—William D. Martin
Assistant Examiner—M. R. Lusignan
Attorney—Melvin C. Flint and Inez L. Moselle

[57] ABSTRACT

This application is directed to the preparation of receiving sheets for printing with transferable colorless, color-forming dye material in which the sensitive pigment that converts the colorless, color-forming dye to colored form is a hydrated aluminum silicate obtained by the hydrothermal treatment of dehydrated kaolin clay. The application discloses the discovery that a high surface area, partially hydrated metakaolin pigment that is capable of producing an intense non-fading printed image may be obtained by terminating the hydration of the dehydrated clay prior to the time when the resulting hydrated aluminum silicate would possess the maximum surface area that could be obtained by the hydrothermal treatment.

3 Claims, No Drawings

PIGMENT FOR PRESSURE SENSITIVE RECORD MATERIAL

RELATED APPLICATION

This application is a continuation-in-part of our copending application, Ser. No. 765,979, filed Oct. 8, 1968, and now abandoned.

BACKGROUND OF THE INVENTION

A type of commercial pressure-sensitive manifold record utilizes the reaction between attapulgite clay and certain colorless, color-forming material to form the printed image. An oily solution of the dye material is encapsulated and the microscopic capsules are coated on transfer surfaces of sheet material. The clay particles are coated on receiving surfaces of the sheets. The sheets are stacked with the transfer surfaces and receiving surface superimposed in face-to-face relationship. When printing pressure is applied to the assembly, the microcapsules rupture and the oily colorless color-forming dye comes into adsorptive contact with the clay particles. Chemical reaction takes place and the adsorbed dye-forming material is converted to colored form, thereby forming the printed image on the receiving sheets.

In an effort to provide receiving sheets which were whiter and brighter than the sheets that were coated with attapulgite, kaolin clay was substituted for the attapulgite clay. Unfortunately, the results were lacking in success because the kaolin clay coated sheets lacked the dye sensitivity of sheets coated with attapulgite clay and the printed images were not dark enough for practical use.

In attempts to overcome this problem, it was found that certain pigments obtained by partially rehydrating metakaolin were sensitive to the dyes and that a colored mark was formed when the dye solution was placed in adsorptive contact with sheets coated with the partially rehydrated metakaolin. The preparation of partially rehydrated metakaolin is described in U. S. Pat. No. 3,224,892 to Hemstock. In accordance with the teachings of this patent, metakaolin (a specific form of calcined anhydrous, amorphous kaolin clay) is subjected to hydrothermal treatment under pressure. During the treatment, the metakaolin gradually hydrates and the surface area (B.E.T.) undergoes an increase, at first gradual and then rapid. After a maximum surface area is reached, hydration further increases and surface area begins to decrease. With representative high purity soft Georgia kaolin clay, maximum surface area is generally obtained when the duration of the hydrothermal treatment is such that the water of crystallization is somewhat above 11 percent.

It had been found, however, that printed images obtained with a partially rehydrated metakaolin pigment possessing maximum surface area and containing somewhat in excess of 11 percent water of crystallization faded shortly after the image was formed. To obtain nonfading images, it was suggested to recalcine such partially rehydrated metakaolin (U.S. Pat. No. 3,226,252 to Glen A. Hemstock) or to blend the uncalcined partially rehydrated metakaolin with a major amount of attapulgite clay (U. S. Pat. No. 3,223,546, also to Glen A. Hemstock). The recalcination had the drawback of increasing substantially the cost of the pigment. On the other hand, when the partially rehydrated metakaolin was blended with attapulgite clay, the sheets lacked the whiteness and brightness of sheets that were pigmented with either calcined or uncalcined partially rehydrated metakaolin.

Prior to our invention or discovery receiving sheets in which uncalcined partially rehydrated metakaolin was the sole or principal dye sensitive pigment were unsatisfactory because the printed images faded in a short time.

THE INVENTION

An object of the invention is to provide improved partially rehydrated metakaolin pigments.

A specific object is to provide improved white receiving sheets containing uncalcined partially rehydrated metakaolin as the sole or principal sensitive pigment, the sheets being characterized by producing images which possess outstanding resistance to fading.

Another object is to control the processing involved in preparing a high surface area aluminum silicate pigment by hydrothermal rehydration of metakaolin to obtain a pigment having a spectrum of desirable properties for use in transfer sheets for printing with colorless color-reactant dye material.

We have made the unexpected discovery that nonfading printed images are obtained when partially rehydrated metakaolin reacts with an oily solution of crystal violet lactone (CVL) and benzoyl leucomethylene blue (BLMB) if, during the preparation of the pigment, the duration of the hydrothermal treatment is controlled as described hereinafter.

Briefly stated, in accordance with this invention, receiving sheets for printing with color-forming dye solutions comprise paper coated or filled with an uncalcined partially rehydrated metakaolin pigment obtained by subjecting an aqueous slip of metakaolin to hydrothermal treatment under pressure, whereby the metakaolin hydrates and the surface area increases, terminating the hydrothermal treatment when the B.E.T. surface area is at least 100 $m^2/g$. and the water of crystallization is above 6 percent but below 11 percent, the termination taking place before the time when the maximum surface area would be obtained, and recovering the resulting hydrated aluminum silicate pigment.

When receiving sheets within the scope of this invention undergo transfer printing with an oily solution of crystal violet lactone and benzoyl leucomethylene blue, dark blue images are immediately formed. The images are usually appreciably darker than images obtained with attapulgite clay. In contrast with images heretofore obtained with uncalcined partially rehydrated metakaolin, the images do not fade within a few days after they have been formed. To the contrary, they maintain their intensity. In most cases the images become darker with the passage of time.

DETAILED DESCRIPTION

A high purity kaolin clay is preferably employed as the starting material for preparing the metakaolin intermediate. The term "kaolin clay" embraces clays the predominant constituent of which is one or more of the following hydrated aluminum silicate minerals: kaolinite, halloysite, nacrite, dickite and anauxite.

The clay should be fractionated in air or water to remove sufficient plus 2 micron particles to provide a fine size fraction at least 80 percent by weight of which is finer than 2.0 microns (equivalent spherical diameter). In general, rehydration time decreases as the particle size of the hydrated clay starting material decreases. A suggested method for fractionating the clay is to disperse the clay in water at about 20 percent solids in the presence of an alkaline dispersant, e.g., sodium silicate, and centrifuge or otherwise classify the dispersion under conditions calculated by application of Stokes law to provide an aqueous suspension containing particles of desired particle size. The aqueous dispersion of fractionated clay is flocculated by addition of mineral acid or acidic salt, thickened and, if desired, bleached in an acid pulp. The bleached clay is filtered, and preferably washed and dried. Bleaching may be omitted, if desired, although any dispersant employed in fractionation should be neutralized so that the kaolin clay is in acid form.

Calcination is carried out at a temperature and for a time such that the hydrated clay undergoes an abrupt endothermic reaction associated with loss of chemically bonded water without undergoing the characteristic exothermic reaction that takes place at about 1,800°F. Kaolin clay that undergoes the endothermic reaction during calcination without undergoing the exotherm is known as "metakaolin" and is amorphous in the sense that it does not diffract X-radiation. A preferred calcination temperature is within the range of 1,200° to 1,450°F., preferably within the range of 1,250° to 1,350°F., and is carried out until the L.O.I. of the clay (as determined at 1,800°F.) is less than 2 percent, preferably less than 1 percent. In commercial practice it may be difficult to control the calcination to the extent that none of the clay undergoes the exotherm. Satisfactory results have been realized with calcined clay about three-fourths of which was metakaolin and the balance clay which had undergone the exotherm after dehydration was substantially complete. Similarly, it is possible to employ calcined kaolin clay containing minor amounts of residual crystalline hydrated kaolin clay. The percentage of metakaolin in a product may be estimated by thermal analysis (DTA) which is a well-known analytical technique employed by mineralogists. The height of the exotherm of the calcined clay sample under investigation is compared to the height of the exotherm of a pure metakaolin standard and from these values the percentage of metakaolin is calculated. True density measurements may also be used to estimate the metakaolin content of the calcined kaolin clay.

After calcination the clay should be cooled and pulverized to minus 200 to 325 mesh (Tyler).

Alternatively metakaolin may be obtained by prolonged dry grinding of a kaolin clay, preferably a high purity clay.

The finely divided metakaolin is mixed with water to form a slip sufficiently fluid for handling and pumping. Preferably, conventional slurrying chemicals such as sodium silicate and sodium condensed phosphates are absent since they may adversely impair the sensitivity of the pigment. Slips containing 5 percent to 33 percent calcined clay solids are feasible. The use of slips of about 20 percent to 25 percent solids is preferable.

The slip of metakaolin is heated in suitable pressure-resistant equipment until a pressure of at least about 300 p.s.i.g. is reached. The pressure is maintained at the elevated pressure until a product having a B.E.T. surface area of at least 100 m$^2$/g., preferably at least 120 m$^2$/g., is produced. As mentioned, the surface area of the hydrothermally treated metakaolin increases as water combines chemically with metakaolin to form a hydrated aluminum silicate having the same silica-to-alumina ratio (2/1) that characterizes kaolin. At first the surface area increases gradually. As hydration progresses, the increase of surface area becomes more rapid until a maximum surface area is reached. When hydrothermal treatment is continued beyond this time, water of crystallization further increases but surface area begins to decrease as kaolinite recrystallizes. The rate of decrease is generally less than the rate of increase which occurs before maximum surface area is attained. Thus, at a given pressure products having comparable surface areas are produced at two different times, one being less than the time required to attain the maximum surface area. In the illustrative examples, it will be seen that products having similar surface areas were obtained at 500 p.s.i.g. at 3½ hours and 5 hours, respectively, and that maximum surface area was realized at an intermediate time. The sample in which hydrothermal treatment was terminated after 3½ hours and before maximum surface area was obtained was more sensitive to an oily mixture of crystal violet lactone and benzoyl leucomethylene blue. When used in pressure-sensitive printing, the image intensified with age. Although the other pigment possessed the same surface area it was significantly less sensitive and the printed image that was formed faded significantly within two days.

Generally speaking, as the pressure increases, the time required to introduce a given amount of water and obtain a maximum surface area decreases. The maximum surface area that can be obtained appears to vary with pressure and with the particle size of the original hydrated clay. As pressure increases, the maximum surface area tends to decrease. Very fine particle size starting clay (e.g., hydrated kaolin having an average size of 0.6 micron) will generally produce a higher surface area rehydrated material containing more water of crystallization than will identically processed hydrated clay having a larger average particle size, e.g., an average size of 0.8 micron. The presence of an overcalcined or undercalcined clay with the metakaolin also affects the maximum surface area and water of crystallization obtained at any pressure. Thus, a mixture of metakaolin with hydrated kaolin or a mixture of metakaolin with clay which has undergone the exotherm will generally rehydrate to a lower surface area and water of crystallization than would be obtained if pure metakaolin were subjected to hydrothermal treatment under the same conditions.

A preferred pressure is within the range of 400 p.s.i.g. to 600 p.s.i.g. At pressures within this range the residence time of the slip is reasonably short and less expensive equipment is required than when higher pressures are used. At a saturated steam pressure of 500 ± 50 p.s.i.g., for example, rehydration time is less than 4 hours and is preferably within the range of 2½ to 3½ hours. At times appreciably less than 2½ hours at such pressure, the pigment may not be as sensitive as it would be if the rehydration time were longer. At times appreciably in excess of 3½ hours at such pressure, the image may be less intense and further, it may fade. Pressures above 600 p.s.i.g. can be used provided the duration of the hydrothermal treatment is very short once the high pressure has been reached. For example, an excellent product has been obtained when the slip was heated in an autoclave to 800 p.s.i.g. and the heating was discontinued as soon as the pressure of 800 p.s.i.g. was reached. The product was generally similar to one produced at 500 p.s.i.g. for about 2 hours.

It is essential to terminate hydrothermal treatment a reasonable period of time before maximum surface area would be expected to be obtained with the reactants and reaction conditions that are employed. This avoids the possibility that the time for providing a product having maximum surface has been exceeded due to inadvertent or unpredictable variation from test conditions employed to predict the time when maximum surface area would be reached. On the other hand, when hydrothermal treatment is carried out for too short a time, the resulting pigments lack the sensitivity of pigments rehydrated for longer periods (provided the times does not exceed that for producing maximum surface area).

During hydrothermal treatment the metakaolin is in contact with a liquid aqueous phase. If desired, the slip may be agitated during the heat treatment. Hydrothermal treatment may be carried out on a continuous basis.

In most instances, at least part of the water should be removed from the slip of the partially rehydrated metakaolin after the slip has cooled. This may be done by settling, filtration and/or drying. The partially rehydrated metakaolin may be dried and ground to 200 mesh or finer before being used to prepare a coating color. Alternatively, the slurry of partially rehydrated metakaolin may be flocced, filtered, dispersed and spray dried.

Especially good results may be expected with partially rehydrated metakaolin products obtained from kaolin clay having an average particle size of 0.8 micron when the partially rehydrated products have water of crystallizations within the range of 7 percent to 9 percent and surface areas within the range of 120 to 160 m²/g. When the products are obtained from finer clay, e.g., kaolin having an average size of 0.55 micron, the preferred partially rehydrated products contain from 7 percent to 10 percent water of crystallization and have surface areas within the range of 120 to 250 m²/g.

A reference setting forth the method for determining surface area by the B.E.T. procedure appears in U. S. Pat. No. 3,229,892 (supra). This patent also describes the steps to be taken in calculating "water of crystallization."

The partially rehydrated metakaolin pigments are amorphous in the sense that their X-ray diffraction patterns do not exhibit sharp X-ray peaks characteristic of crystalline substances having a crystal size sufficient to diffract X-radiation. However, weak 12.5° 2θ peaks (diagnostic of kaolinite) may be observed in patterns of some products obtained from amorphous calcined kaolin clay. The presence of strong kaolinite peaks indicates that the hydrothermal treatment has been carried out for too long a time and the time for producing maximum surface area has been exceeded.

The particle size distribution of the products varies with the size of the metakaolin employed and with the parameters of the hydrothermal treatment. Representative products contain from about 80 percent by weight of ultimate particles finer than 2 to 4 microns and 50 percent by weight of particles finer than 1 to 3 microns.

G. E. brightness of the products is usually within the range of about 85 percent to 92 percent. Partially rehydrated pigments obtained by treating slips free from conventional dispersants have pH values (20 percent suspensions) within the range of about 4.2 to 5.2.

The partially rehydrated metakaolin of the present invention is preferably employed as the sole sensitive pigment. However, minor amounts of other sensitive pigments may be used in combination with it. Insensitive white extender pigments such as kaolin clay may be present in the formulations. Recommended blends consist of 50 to 95 parts by weight partially rehydrated metakaolin and 50 to 5 parts by weight kaolin clay.

In addition to the finely divided partially rehydrated metakaolin pigment, coating compositions contain as essential ingredients water and a polymeric adhesive (starch such as oxidized or cationic starch and/or latex such as styrene-butadiene or acrylic ester). Especially when high solids coating colors are used, the coating colors may also contain dispersants. Organic dispersants such as the anionic dispersants supplied under the trade name "Lomar PW" are preferred and they are preferably used with ammonia to adjust pH to a value of about 8 or 9. Reference is made to a copending application of Barry S. Miller, Ser. No. 728,893, filed May 14, 1968 and now U.S. Pat. No. 3,582,378, patented June 1, 1971.

Receiving sheets may be coated with the pigmented coating compositions by on-machine or off-machine coating methods. Coat weight is usually within the range of about 2 to 6 lbs. per ream (3,000 sq. ft.).

The pigment coating may be applied to the reverse side of a sheet coated with an emulsion of encapsulated oily dye or dye mixture or the pigment coating may be superimposed on the emulsion to provide self-contained record sheets.

It is also within the scope of the present invention to employ the partially rehydrated metakaolin as a filler for pressure-sensitive record material. Conventional methods for filling paper with mineral pigments may be employed. Reference is made to Sutermeister, CHEMISTRY OF PULP AND PAPER MAKING, Third Edition, John Wiley and Sons, pages 336 to 342.

While the invention is directed especially to the provision of receiving sheets for printing with oily solutions of a mixture of crystal violet lactone and benzoyl leucomethylene blue, the receiving sheets of the invention may also be used to print with other colorless chromogenic compounds which react with the pigment on the sheets in an electron donor-acceptor reaction to form colored marks. Examples of other colorless chromogenic compounds are malachite green lactone, Michler's hydrol, rhodamine B-lactone, derivatives of N-phenylleucauramine and crystal violet carbinol. Frequently colorless compounds of this type are mixed with an oxidizable colorless dye such as benzoyl leucomethylene blue.

In the examples which follow the sensitivity of pigment-coated sheets towards a mixture of crystal violet lactone and benzoyl leucomethylene blue was made as follows. A commercial sheet of printing paper uniformly coated with a microencapsulated solution of crystal violet lactone and benzoyl leucomethylene blue in chlorinated diphenyl oils was placed in face-to-face relationship with the coating on the pigment coated sheet. While the two sheets were in contact, they were passed through a calender under a pressure of about 60 p l i. This pressure was sufficient to rupture the capsules on the transfer sheet, liberate the solution of dyes and thereby form a printed image on the pigment-containing receiving sheet.

Sensitivity was determined by contrasting the printed and unprinted areas of the calendered sheets. The sensitivity testing involved separately determining the reflectances of the printed area and the reflectance of the background with a Bausch and Lomb Opacimeter with a green filter (572 mu peak). A "calendar intensity" value was then calculated in accordance with the following equation Percent calender intensity =

$$\frac{\text{average reflectance of printed area} \times 100}{\text{average reflectance of background}}$$

A low calender intensity value therefore indicates a high contrast of printed to background and represents a sharp printed image. A high calender intensity value represents a low contrast ratio.

Calender intensity values were determined 30 seconds after calendering and 48 hours after testing. Since sharpness of print varies inversely with calender intensity value, an increase in the value after the printed sheet had aged for 48 hours indicated that the printed image had faded. Conversely, a 48 hour value that was less than the 30 second value indicated that the printed image had become more intense with age.

EXAMPLE I

This example illustrates that when preparing partially rehydrated metakaolin for use as a pigment in pressure-sensitive record material, the rehydration of metakaolin should be terminated before the time when maximum surface area would be reached.

A blend of fine size fraction and coarse size fraction of zinc hydrosulfite bleached, acid kaolin clay was obtained. The clay was 100 percent minus 7.0 microns, 50 percent minus 1 2 microns and 16 percent minus 0.64 micron. The clay was calcined in a rotary kiln with countercurrent flow of combustion gases. True density studies indicated that the calcined product contained about 75 percent metakaolin, the balance being substantially amorphous calcined kaolin that had undergone the exotherm.

The metakaolin was mixed with deionized water to form a slip containing 20 percent solids. Three and one-half gallon portions of the slip were separately placed in a 5-gallon autoclave which was heated by external heating coils until a saturated steam pressure of 500 p.s.i.g. was reached. The slips were maintained at that pressure for various lengths of time and heating was discontinued. In one run, the heating was discontinued as soon as the pressure reached 500 p.s.i.g. The slips were allowed to return to ambient pressure and temperature. They were then filtered, oven dried at about 250°F. and pulverized in a hammer mill with a 0.02 inch screen.

Coating colors (28 percent solids) were made with all partially rehydrated metakaolin products by mixing an aqueous slip of the pigment with an emulsion polymerized, neutral styrene-acrylic latex containing 46 percent solids ("Ucar Latex 40"). All coating colors contained 100 parts by weight of pigment to 5 parts by weight of binder solids. No dispersants were present. After the ingredients had been mixed, the colors were screened through a 100 mesh (Tyler) vibrating screen.

Sheets of paper (Appleton raw stock, 33 lb./ream were coated with the coating colors to produce a coat weight of 5 lbs./ream (3,000 ft$^2$.). Coating was in the machine direction on the felt side. The sheets were dried and calendered immediately after being coated.

The dried and calendered sheets were immediately transferred to individual sealed polyethylene bags which were stored in a closed drawer in a room maintained at a substantially constant temperature of 73°F. and 50 percent R.H.

The data for the results appear in Table I and show that as the duration of hydrothermal treatment increased the water of crystallization increased. Surface area increased and reached a maximum between 3½ and 5 hours. As the surface area increased, the initial sensitivity of the pigment increased until the time for producing maximum surface area was exceeded and the pigment products became less sensitive. When hydrothermal treatment was terminated before maximum surface area was reached, the partially rehydrated pigments produced intense nonfading images provided water of crystallization was above 6 percent and below 11 percent. Especially good results were achieved when water of crystallization of the pigments were within the range of about 7 percent to 9 percent. On the other hand, when hydrothermal treatment was carried out at 500 p.s.i.g. for 4 hours or more, the images obtained with the resulting pigments were less intense and faded within 48 hours. The fading was greater as the duration of the hydrothermal treatment further increased.

It was interesting to note that after 3½ hours and 5 hours at 500 p.s.i.g. rehydrated metakaolin pigments having substantially the same surface areas were produced. The 146 m$^2$/g. pigment obtained with a hydrothermal treatment of 3½ hours duration had an initial calender intensity value of 38 percent and the image intensified in 48 hours to a value of 36 percent. The 147 m$^2$/g. pigment obtained with a hydrothermal treatment of 5 hours had substantially the same surface area as the pigment obtained with a hydrothermal treatment of 3½ hours. However, the initial image was less intense with the 5 hour hydrothermal treatment (calender intensity value of 43 percent) and this image faded considerably in 48 hours, as shown by the 49 percent calender intensity value.

Table I

Effect of duration of hydrothermal treatment on the sensitivity of partially rehydrated metakaolin pigments Rehydration
Conditions
Pressure/          Properties

| Time (p.s.i.g./ hours) | of Pigment Surface Area (B.E.T., m²/g.) | Water of Crystallization Weight, % | Sheet Sensitivity Calender Intensity Value, % ±1 30 sec. | 48 hrs. |
|---|---|---|---|---|
| 500/0 | 54 | 4.04 | 47 | 45 |
| 500/1 | 76 | 5.44 | 41 | 37 |
| 500/2 | 104 | 6.82 | 37 | 35 |
| 500/3 | 143 | 9.38 | 38 | 34 |
| 500/3.5 | 146 | 10.63 | 38 | 36 |
| 500/4 | 165 | 12.07 | 41 | 43 |
| 500/5 | 147 | 12.09 | 43 | 49 |
| 500/6 | 136 | 12.58 | 45 | 57 |

EXAMPLE II

This example illustrates the preparation of a sensitive partially rehydrated metakaolin at a higher steam pressure than used in Example I.

A sample of the metakaolin employed in tests in Example I was prepared into a 20 percent solids slip. The slip was heated to 800 p.s.i.g. as described in Example I and as soon as this pressure was reached heating was discontinued. During the hydrothermal treatment, pressure was almost 700 p.s.i.g. after 2 hours and within the range of 700 to 785 p.s.i.g. for about one-half hour. The slip was cooled, filtered and ground. The product had a water of crystallization of 7.28 percent and a surface area of 106 m²/g.

The pigment was prepared into a coating color and the resulting pigmented receiving sheet was tested for sensitivity as in Example I. The sheet had 30 second and 48 hour calender intensity values of 39 percent and 37 percent, respectively. This indicates that the image was intense and darkened with age.

EXAMPLE III

This example further illustrates the preparation of a sensitive pigment by the controlled rehydration of metakaolin and the use of the pigment in pressure-sensitive record material.

A fine size fraction of high purity kaolin containing at least 90 percent by weight of particles finer than 2 microns and having an average particle size of 0.55 micron (equivalent spherical diameter) was employed as the starting material. The clay was 100 percent finer than 4 microns. This clay was obtained by dispersing a soft Georgia kaolin crude in water containing sodium silicate, degritting and then fractionating the slip to recover the fine size fraction. The slip containing the fine size fraction of kaolin was flocced by adding sulfuric acid, thickened by decantation and bleached with zinc hydrosulfite solution. The bleached clay was washed, dried and ground.

The ground kaolin clay was calcined in a muffle furnace at 1,290°F. for 2 hours. After the calcined clay had cooled, it was prepared into 20 percent solids slips without addition of any dispersant. About 3½ gallons of the slip was placed in the electrically heated 5-gallon capacity stainless steel autoclave. The autoclave was sealed and heated until a saturated steam pressure of 500 p.s.i.g. was attained. The contents of the autoclave were maintained at 500 p.s.i.g. for 3 hours. After cooling, the contents were dried in an oven and ground to minus 200 mesh in a high speed hammer mill.

The pigment contained 10.4 percent water of crystallization and had a B.E.T. surface area of 228 m²/g.

Receiving sheets printed with the high surface area partially rehydrated metakaolin pigment were prepared as follows. A pigment-water slip containing 35 percent solids was prepared by adding a portion of the pigment to dilute ammonia water in a high shear mixer (Osterizer), shearing at low shear for 4 minutes, adding the balance of the pigment and shearing at high shear for 1 minute. The use of ammonia to improve the sensitivity of a partially rehydrated metakaolin pigment is disclosed and claimed in a copending application of Barry S. Miller, Ser. No. 89,082, filed Nov. 12, 1970, which is a continuation-in-part of Ser. No. 723,602, filed Apr. 23, 1968, now abandoned. "Ucar Latex 40" was added slowly to the pigment suspension in quantity to provide 15 parts by weight of latex solids to 100 parts by weight of pigment, followed by mild agitation. The pH of the coating composition was about 9.

The coating composition was coated on the Appleton raw stock at a coat weight of 5 lbs./ream (3,000 ft.²). Coating was on the machine direction on the felt side. Sheets were air dried and supercalendered (cold) p.l.i., 2 passes.

The dried and calendered sheets were immediately transferred to individual sealed polyethylene bags which were stored in a closed drawer in a room maintained at substantially constant temperature of 73°F. and 50 percent relative humidity. Some of the sheets were printed by the calendering procedure and tested for sensitivity before the unsensitized sheets had aged for 2 days.

Other unsensitized receiving sheets were subjected to an accelerated aging treatment during which they were subjected to high temperature and high humidity by placing sheets in an atmosphere generated by heating a saturated salt (NaCl) solution to 180°F. for 48 hours. The aged sheets were then printed with the transfer sheets containing the encapsulated leuco dyes and calender intensity values determined 30 seconds and 48 hours after printing, as described above, to determine what effect the high temperature and humidity would have on sensitivity.

The results are summarized in Table II.

TABLE II

Properties of receiving sheets pigmented with partially rehydrated metakaolin

| Unaged Sheets | Calender Intensity, % |
|---|---|
| 30 sec. | 35 |
| 48 hrs. | 32 |
| Aged Sheets | |
| 30 sec. | 39 |
| 48 hrs. | 47 |

Data in Table II for the results of printing with the pigmented receiving sheets show that the unaged sheets were very sensitive and produced nonfading images. The aged sheets were only slightly less sensitive and fading was within tolerable limits for aged sheets.

EXAMPLE IV

This example further illustrates the necessity for controlling the duration of hydrothermal treatment when preparing partially rehydrated metakaolin pigments for use in pressure-sensitive record material.

The starting material was a fine size fraction of paper coating kaolin clay ("HT"). The clay was carefully calcined under conditions to produce metakaolin.

In accordance with this invention, one portion of the calcined clay was slurried in water and the slurry was rehydrated at 500 p.s.i.g. to a water of crystallization of 8.2 percent and a surface area of 161.8 m²/g. Another portion was under-rehydrated at the same pressure in a different autoclave under conditions which resulted in a product containing 5.6 percent water of crystallization and a surface area of 94.7 m²/g. A third portion was over-rehydrated at 500 p.s.i.g., resulting in a product containing 11.9 percent water of crystallization and having a surface area of 106.2 m²/g.

The product prepared in accordance with this invention and containing 8.2 percent water of crystallization and having surface area of 161.8 m²/g. had outstanding 30 second and 48 hour calender intensity values of 33 percent and 30 percent, respectively. The product which was insufficiently rehydrated (containing less than 6 percent water of crystallization and a surface area below 100 m²/g.) had 30 second and 48 hour calender intensity values of 44 percent and 43 percent, respectively. Thus, when rehydration time was inadequate, the sheets coated with the resulting pigment lacked the sensitivity and faded more than did sheets coated with a pigment prepared in accordance with principles of the invention. When the metakaolin was over-rehydrated and water of crystallization exceeded 11 percent, the sheets had 30 second and 48 hour intensity values of 47 percent and 45 percent, respectively, in spite of the fact that the surface area of the pigment exceeded 100 m²/g.

These results therefore further demonstrate that the development of high surface area in a partially rehydrated metakaolin pigment is not the sole factor which determines the suitability of a sensitive partially rehydrated metakaolin pigment in pressure-sensitive record material. To the contrary, the results demonstrate the necessity for controlling the water of crystallization in the rehydrated product and limiting it to a value below 11 percent while using sufficient time during the rehydration step to develop high surface of at least 100 m²/g.

We claim:

1. An article of manufacture in the form of a sheet and consisting essentially of paper having coated thereon finely divided particles of a sensitive hydrated aluminum silicate pigment containing 7 percent to 9 percent water of crystallization and having a B.E.T. surface area of at least 100 m²/g. and an adhesive binder therefor, said hydrated aluminum silicate pigment having been obtained by mixing water with finely divided particles of dehydrated kaolin clay in the form of metakaolin to form a fluid slip, heating said slip in a closed vessel under a pressure of at least 300 p.s.i.g., whereby the metakaolin is capable of gradually rehydrating and increasing in B.E.T. surface area unit a maximum surface area is attained when the water of crystallization is slightly above 11 percent, maintaining the slip of metakaolin under the elevated pressure and temperature for a time only sufficient to rehydrate the metakaolin to a water of crystallization within the range of 7 percent to 9 percent and a B.E.T. surface area of at least 100 m²/g., and recovering the aluminum silicate thus hydrated without subsequently calcining it to remove water of hydration.

2. The article of claim 1 wherein the hydrated aluminum silicate is obtained by heating the slip of metakaolin at a pressure of about 500 p.s.i.g. for a time within the range of 2½ to 3½ hours.

3. The article of claim 2 wherein the B.E.T. surface area of the pigment is within the range of 120 to 160 m²/g.

* * * * *